UNITED STATES PATENT OFFICE 2,330,787

ISOMERIZATION OF NORMAL PARAFFINS

Stanley Francis Birch and John Henry Beynon, Sunbury-on-Thames, England, assignors, by mesne assignments, to Anglo-Iranian Oil Company Limited, London, England, a company of Great Britain No Drawing. Application May 13, 1940, Serial No. 334,982. In Great Britain March 16, 1939

2 Claims. (Cl. 260—683.5)

This invention relates to the isomerization of the normal paraffin n-butane or n-pentane for the recovery of isobutane or isopentane.

The applicants have found that anhydrous ferric halides which are themselves active only to a small extent as catalysts in that reaction, have particular potency as promoters of catalysis when aluminium halides are used as catalysts either alone or when hydrogen chloride is also present as promoter.

Thus according to the invention in the isomerization of normal butane or normal pentane for the production of isobutane or isopentane an anhydrous ferric halide such as ferric chloride is added as a catalytic promoter when an aluminium halide such as aluminium chloride is used alone as catalyst, or when the aluminium halide is used together with hydrogen chloride as promoter.

The invention comprises the conditions hereinafter described.

The reactants may be contacted with the catalyst and catalytic promoter or promoters in any convenient way, and advantageously the anhydrous ferric halide such as ferric chloride, is first incorporated with the aluminium halide.

The process may be carried out in batches or in a continuous manner. In the latter case the stream of normal paraffin in admixture if desired with a gaseous promoter such as a hydrogen halide and preferably hydrogen chloride, is passed continuously through a bed of solid catalyst with which the anhydrous ferric halide promoter is incorporated.

The hydrocarbon mixture leaving the reaction zone may then be fractionated if desired to yield high concentrates of the isoparaffin or the substantially pure isoparaffin, the normal hydrocarbon fraction being returned to the reaction zone.

The reaction is carried out at an elevated temperature within the range of about 50–200° C. and in either liquid or vapour phase. In the former case a super-atmospheric pressure, advantageously below 50 atmospheres, is employed at a convenient temperature within the range indicated. Operation at increased pressures may also with advantage be carried out in the vapour phase, whereby the throughput of a reaction vessel of given internal volume is increased.

The promoted catalyst may conveniently be prepared by mixing or melting together the aluminium and ferric halides in the desired proportions, and the promoted catalyst may be used in admixture with or incorporated upon inert carriers such as silica gel or active carbon: the catalyst thus prepared may be provided in the form of pellets or extruded granules.

The proportion of catalyst and promoter and their proportion in respect of the normal paraffin under treatment may be varied, but the ferric halide promoter should not exceed 20% by weight of the total catalyst. So long as the anhydrous aluminium chloride contains no other metallurgical impurity than ferric chloride it may be used for the addition to it of ferric chloride in a proportion of from about 1.7 to not more than 20% of the total weight of catalyst in the process described. The proportion of the catalyst in respect of the hydrocarbon may be varied over wide limits depending on the raw materials, the temperature and pressure conditions, the duration of the reaction period and the desired degree of conversion.

In a batch process the proportion of aluminium chloride is advantageously equivalent approximately to a molecular proportion of 1 part to 20 parts of the normal paraffin.

In continuous operation it will be clear that the proportion of aluminium chloride in respect of the quantity of normal paraffin present in the reaction vessel at any one time will normally be considerably greater than that in a batch process in which the proportions are as above indicated.

It is preferred to carry out the process in a continuous manner. Thus for example normal butane or a C4 gas fraction containing it may be passed upwardly through a reaction vessel charged with the promoted catalyst, and the material comprising the conversion product is passed to a fractionating column from which the unreacted normal paraffin may be withdrawn at the base of the column for recycling with fresh normal paraffin. The normal paraffin is before admission to the lower end of the reaction vessel first passed through a heating coil and the material issues at the upper end of the reaction vessel and passes thence through a cooler before entering a separator. The material is thence passed by means of a pump into the fractionating column after first passing through a preheater. The fractionated product passes through an outlet at the upper end of the fractionating column and thence through a cooling coil to a reflux drum whence a part of the condensed isobutane is returned to the fractionating column, the rest passing to the receiving tank.

Alternatively the process may be carried out in the liquid phase and the mixed aluminium chloride and ferric chloride added in a powdered condition, the reaction vessel being provided with stirrers for the purpose of ensuring intimate admixture of the promoted catalyst with the material treated. It will be understood that the catalyst may be withdrawn from the reaction vessel and replaced by fresh material.

The following comparative tests indicate the advantage of the use of a small proportion of anhydrous ferric chloride as a promoter of catalysis in the reaction and under the conditions referred to.

1. 116 g. of n-butane were added to 13.35 g. of aluminium chloride in a steel pressure vessel to which upon its closure heat was applied until a temperature of 100° C. was reached and that temperature was maintained for a period of 24 hours. During the whole of the time the contents of the vessel were vigorously agitated. The hydrocarbons produced were separated by distillation from the catalyst. It was found that 25.92% of the normal paraffin had been converted into isobutane, and that the remainder consisted mainly of unreacted n-butane together with 1.5% butene.

2. The same reaction was carried out under the same conditions as test 1, except that the n-butane used was saturated with hydrogen chloride prior to the treatment. The extent of conversion of the normal paraffin to isobutane under these conditions was found to be 61.1%.

3. The same reaction was carried out under the same conditions as test 1, except that according to the present invention the same weight of aluminium chloride was made up with 1.7% of anhydrous ferric chloride. The extent of conversion of the normal paraffin to isoparaffin under these conditions was found to be 70.24%.

The use of aluminium halides such as aluminium chloride as catalysts in the isomerization of a normal paraffin is known, and the use of hydrogen chloride is also known as a promoter of catalysis in that reaction, and in the use of such catalyst and such a catalytic promoter the isomerization of n-pentane in a continuous process has been proposed.

We claim:

1. A process of producing isoparaffins, particularly isobutane and isopentane, by isomerization of the normal paraffin, consisting in contacting the normal paraffin with aluminium chloride as catalyst in the presence of anhydrous ferric chloride as a catalytic promoter in a proportion of the order of from 1.75% to 20% by weight of the total aluminium chloride, at an elevated temperature in the range of about 50°–200° C., the isoparaffinic product being separated from the catalyst and the promoter.

2. A process as specified in claim 1, in which the reaction is carried out in the presence also of hydrogen chloride.

STANLEY FRANCIS BIRCH.
JOHN HENRY BEYNON.